US007158393B2

(12) United States Patent
Schneider

(10) Patent No.: US 7,158,393 B2
(45) Date of Patent: Jan. 2, 2007

(54) POWER CONVERSION AND VOLTAGE SAG CORRECTION WITH REGENERATIVE LOADS

(75) Inventor: Robert S. Schneider, Middleton, WI (US)

(73) Assignee: Soft Switching Technologies Corporation, Middleton, WI (US)

( * ) Notice: Subject to any disclaimer, the term of this patent is extended or adjusted under 35 U.S.C. 154(b) by 109 days.

(21) Appl. No.: 11/079,007

(22) Filed: Mar. 11, 2005

(65) Prior Publication Data

US 2006/0202636 A1 Sep. 14, 2006

(51) Int. Cl.
*H02J 3/00* (2006.01)

(52) U.S. Cl. ........................................... 363/34; 363/37
(58) Field of Classification Search ............ 363/34–40, 363/55
See application file for complete search history.

(56) References Cited

U.S. PATENT DOCUMENTS

| 4,666,020 | A | | 5/1987 | Watanabe | 187/290 |
|---|---|---|---|---|---|
| 4,843,533 | A | | 6/1989 | Roof et al. | 363/55 |
| 4,904,918 | A | | 2/1990 | Bailey et al. | 318/762 |
| 5,034,669 | A | | 7/1991 | Sako et al. | 318/376 |
| 5,157,574 | A | | 10/1992 | Tuusa | 361/56 |
| 5,465,202 | A | | 11/1995 | Ibori et al. | 363/37 |
| 6,118,676 | A | * | 9/2000 | Divan et al. | 363/34 |
| 6,320,767 | B1 | | 11/2001 | Shimoura et al. | 363/37 |
| 6,377,478 | B1 | | 4/2002 | Morishita | 363/34 |
| 2001/0030514 | A1 | * | 10/2001 | Takahashi et al. | 315/219 |
| 2002/0118496 | A1 | | 8/2002 | Petruska | 361/23 |
| 2005/0219864 | A1 | * | 10/2005 | Furukoshi et al. | 363/16 |
| 2005/0248965 | A1 | * | 11/2005 | Yamada et al. | 363/21.08 |
| 2006/0013020 | A1 | * | 1/2006 | Aso | 363/21.01 |
| 2006/0044846 | A1 | * | 3/2006 | Hjort et al. | 363/34 |

* cited by examiner

*Primary Examiner*—Tuyet Vo
*Assistant Examiner*—Tung Le
(74) *Attorney, Agent, or Firm*—Foley & Lardner LLP

(57) ABSTRACT

In dynamic voltage sag correctors and other power conversion equipment having a DC bus that is subject to over-voltage conditions due to power being fed back by a regenerative load, a bus discharge switching device and a discharge resistor are connected in series across the DC bus lines. The discharge switching devices are switched on to discharge the energy storage device connected to the bus, or to separately discharge the two capacitors of a split capacitor DC bus, to eliminate the over-voltage conditions. The discharge switching devices may be switched on and off periodically with a selected duty cycle to discharge energy from the energy storage capacitor or other energy storage device through the discharge resistor at a rate which does not exceed the power rating of the discharge resistor. The discharge switching device may be switched with a fixed duty cycle or with a variable duty cycle that is based on the dynamic power dissipation characteristics of the discharge resistor.

26 Claims, 4 Drawing Sheets

POWER CONVERSION AND VOLTAGE SAG CORRECTION WITH REGENERATIVE LOADS

FIELD OF THE INVENTION

This invention pertains generally to the field of electrical power supplies and power conversion systems, and particularly to power line conditioning systems for correcting voltage sag and drop conditions.

BACKGROUND OF THE INVENTION

Power line conditioning systems are in common use to provide compensation for and correction of voltage sags and drops in the power provided from utility power lines to a critical load. Momentary voltage disturbances such as sags and swells, if not compensated, can result in significant financial losses for industrial power users because of potential shutdown of voltage-sensitive production equipment in the middle of critical processes, with resulting scrap, equipment damage, and lost production. Voltage sags and swells are a widespread, inherent and inevitable problem in any large-scale power distribution network. Various systems and techniques for correcting voltage disturbances have been developed and are commercially available at cost levels that generally depend on the level of protection provided. In particular, uninterruptible power supplies (UPS) are widely used and commercially available over a wide range of backup power requirements. UPS systems offer comprehensive power protection but are also relatively costly and maintenance intensive. As an alternative to full UPS systems, dynamic voltage sag correctors have been developed which utilize residual grid voltage and capacitors as energy sources rather than expensive, high maintenance, long term energy storage devices such as batteries and flywheels. Such dynamic sag correction systems are smaller, less costly, and have lower maintenance requirements than conventional UPS products, but nonetheless provide power protection for periods of time sufficient to correct more than 90% of the voltage sag and drop events which are likely to be encountered by most utility customers. Such voltage sag correctors are described in U.S. Pat. No. 6,118,676, entitled Dynamic Voltage Sag Correction.

Some types of loads which are protected by a UPS or other power protection device are capable of delivering real power back to the power protection device. One example of such a load is an electric motor, which can effectively function as a generator under certain conditions. This "regenerative" power is delivered back to the energy storage device of the power protection equipment. For cost and reliability reasons, most commercial power protection equipment utilizes a rectifier having uncontrolled rectifying devices rather than active switches so that the regenerative power cannot be transferred to the utility power lines. Conventional battery based UPS systems are often not well suited to handling regenerative loads because batteries generally are limited in the rate at which they can absorb energy. Some flywheel based UPS products can handle regenerative loads but are also more expensive and bulkier than battery based systems. For voltage sag correctors having capacitor energy storage, the regenerative power will cause the DC voltage across the storage capacitor to rise. This can potentially lead to a DC bus over-voltage condition which requires that the inverter of the device be shut off before damage to the inverter components can occur, with the consequence that sag correction is not available under these regenerative load conditions. An over-voltage condition can also occur on the DC bus when voltage spikes or transients on the utility lines are passed by the rectifier to the DC bus. Similar problems are encountered in AC power converters which supply their inverter from a DC bus across which a DC bus capacitor is connected. One solution to this problem has been to connect a power resistor and a semiconductor switch in series across the DC bus. Under regenerative load conditions or voltage spikes from the utility lines, the DC bus voltage rises until a threshold is reached, at which point the semiconductor switch is turned on and current is drawn from the DC bus through the power resistor. The resistor is sized such that, when applied, it draws charge out of the DC bus capacitor at a higher rate than the charge provided by the regenerative power or voltage spikes. The DC bus voltage thus begins to fall until a lower threshold is reached and the semiconductor switch is then turned off. The cycle repeats itself as required such that the net charge delivered to the DC bus is zero, thus keeping the DC bus voltage from rising to damaging levels. In the process, the power resistor must dissipate the regenerated energy as heat. This approach to controlling the DC bus under regenerative load conditions requires a relatively high power rated resistor which must be packaged so that it is capable of dissipating a significant amount of heat without affecting other system components, thus increasing the relative cost and size of the overall device.

AC motor drives and series connected sag correctors may utilize full bridge and half bridge inverters. In some inverter configurations, the DC bus capacitor is split and implemented as two separate capacitors connected together in series across the DC bus lines, with a DC bus common line connected between the two capacitors. It is possible under certain asymmetrical load conditions (a condition of some finite DC load current) that one half of the DC bus delivers charge to one of the capacitors while the other half of the bus collects charge from the other capacitor. The capacitor that collects charge is subject to the same over-voltage condition as discussed above, even though the total voltage across the DC bus lines might not exceed its rated maximum threshold.

SUMMARY OF THE INVENTION

A power conversion module in accordance with the present invention is capable of supplying AC power to potentially regenerative loads with high efficiency, relatively low cost, and high reliability. The power conversion module may be incorporated in systems utilized in applications such as AC motor drives, power conditioning equipment, including battery storage UPS systems, and dynamic voltage sag correctors with capacitive energy storage. Component size and cost can be minimized in accordance with the invention by utilizing control of the dissipation of regenerative power in a manner which takes advantage of the dynamic performance characteristics of the components utilized for dissipating the regenerative power.

A power conversion module in accordance with the invention includes a rectifier having rectifying devices connected to receive AC input power from AC input lines and to provide DC power on high and low DC bus lines. First and second energy storage capacitors are connected in series across the DC bus lines. The connection between the capacitors defines a common node to which a DC bus common conducting line is connected. An inverter having inverter switching devices is connected to the DC bus lines to receive power therefrom, and with the inverter switching devices switchable to provide AC output power. A first bus discharge switching device and a discharge resistor are connected in series across the high DC bus line and the common line, and in parallel with the first energy storage capacitor. A second bus discharge switching device and a discharge resistor are connected in series between the common line and the low DC bus line and in parallel with the second energy storage capacitor. A DC bus control circuit is connected to the DC bus lines and the common line to receive the voltage therefrom and is connected to the first and second bus discharge switching devices. The DC bus control circuit selectively turns the first discharge switching device on for a period of time when the voltage between the high DC bus line and the common line exceeds a selected limit and turns the second discharge switching device on for a period of time when the voltage between the low DC bus line and the common line exceeds a selected limit. The turn-on of the first or second discharge switching device thereby discharges the energy storage capacitor to which it is connected to reduce the voltage thereon, so that excessive voltage which might occur across one of the energy storage capacitors is avoided even if the total voltage across the DC bus lines is within acceptable limits. Controlling the voltage separately on the two energy storage capacitors in this manner allows accommodation of any of various types of conditions that might otherwise result in an excessive charging of the storage capacitors, including regenerative power flowing back from a load into the DC bus lines or voltage spikes from the utility power system passed through the rectifier to the DC bus lines.

During an over-voltage condition on one or both of the energy storage capacitors, the discharge switching device connected to that capacitor preferably switches on and off periodically with a selected duty cycle (ratio of on-time to total time of a period) to discharge energy from the energy storage capacitor through the discharge resistor. The duty cycle and the period of switching can be selected to ensure that the temperature rating of the discharge resistor is never exceeded. The discharge resistor can be sized so that its average power rating can handle the expected maximum regenerative power without damage. If the regenerative power will be applied only for a relatively short duration, as is the case for voltage sag correctors which are intended to operate only intermittently for short periods of several seconds or less, the discharge resistor can absorb energy at a much higher rate initially, when it is at a low temperature, than it is able to absorb on average after it has reached its maximum operating temperature. In accordance with the present invention, it is preferred that the control circuit control the switching of the discharge switching device during an over-voltage condition using a variable duty cycle that is based on the dynamic power dissipation characteristics of the discharge resistor. The variable duty cycle may be determined, for example, by the temperature of a model of the discharge resistor such that the discharge switching device is turned off when the model of the discharge resistor indicates that a high set-point temperature is reached, and is turned on when the model of the discharge resistor indicates that a lower set-point temperature has been reached. Where over-voltage bus conditions due to regenerative loads or power line transient spikes are infrequent and of short duration, as is typically the case for most events compensated by voltage sag correctors, the over-voltage condition can be eliminated more rapidly using lower rated components than would be possible using a fixed duty cycle that was selected to ensure that the average maximum power rating of the discharge resistor was never exceeded. By controlling the discharge of the DC bus in this manner, it is possible to reduce not only the resistor size and cost, but also the size and cost of other components that otherwise would be required to be rated for higher average power dissipation, such as heatsinks for the discharge switching devices, fuses, and the conductors connecting the various components. The use of a variable duty cycle in accordance with the invention will always allow the maximum available power absorption capacity to be utilized. Power conditioning equipment incorporating the invention can be designed to operate up to reasonable selected limits on the frequency and duration of disturbances and to provide component protection outside those limits.

Further objects, features and advantages of the invention will be apparent from the following detailed description when taken in conjunction with the accompanying drawings.

DETAILED DESCRIPTION OF THE INVENTION

The present invention may be implemented as a power conversion module capable of supplying AC power to potentially regenerative loads for applications such as motor drives, power conditioning equipment including battery energy storage UPS, and dynamic voltage sag correctors with capacitive energy storage. The present invention is particularly well suited to be incorporated in a dynamic voltage sag corrector having capacitive energy storage to protect against over-voltage conditions that can occur under regenerative load conditions. The present invention will be described below implemented in a dynamic voltage sag corrector, although it is understood that the power conversion module of the invention may be utilized in other applications.

Figure 1:
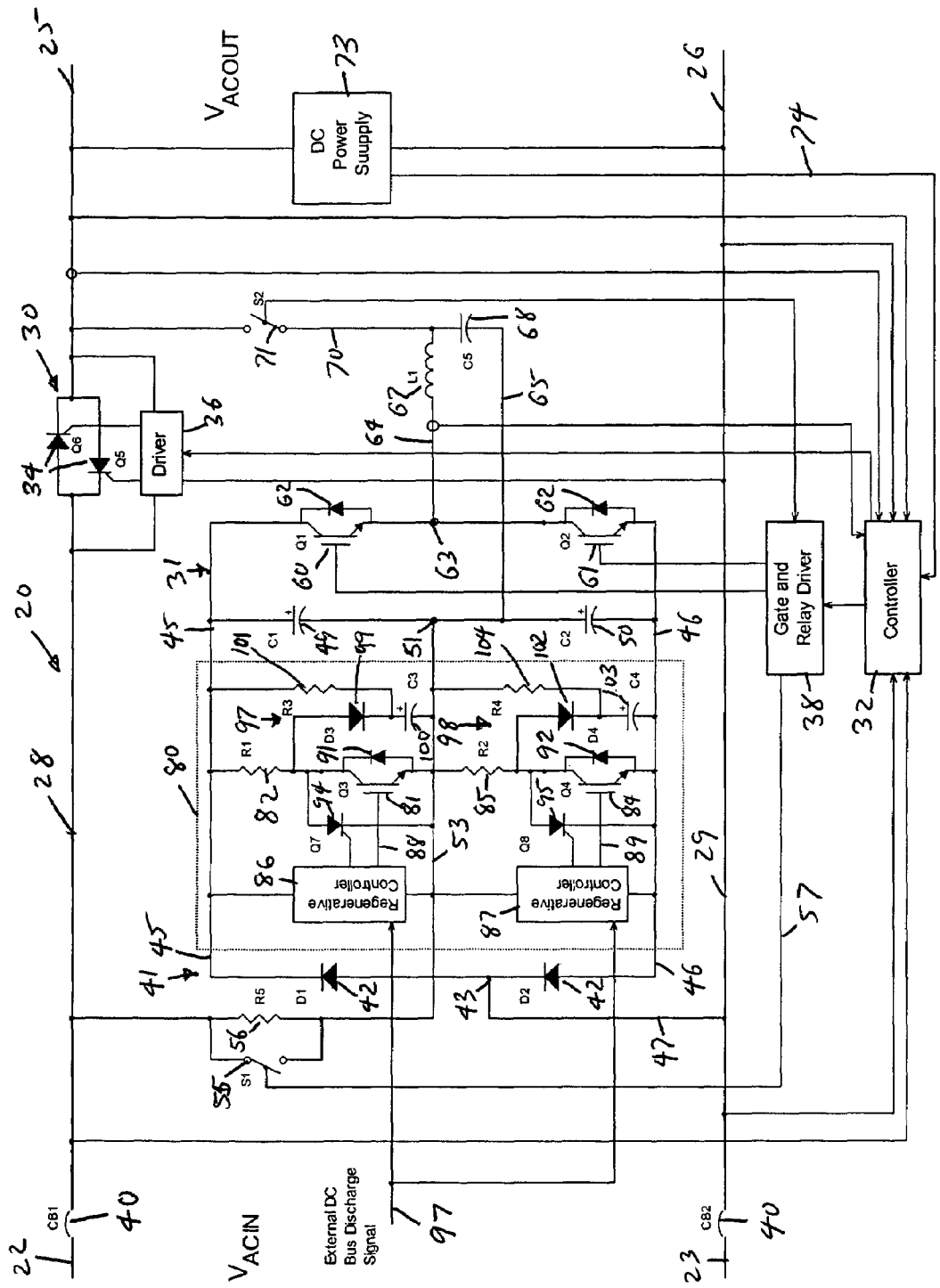
FIG. 1 is a schematic circuit diagram of a dynamic voltage sag corrector incorporating the invention.

As shown generally at 20 in FIG. 1, a dynamic voltage sag corrector in accordance with the invention receives AC power at a voltage $V_{acin}$ from a power source (e.g., utility lines) on AC power input lines 22 and 23, and delivers AC power at a voltage $V_{acout}$ to a load on output lines 25 and 26. The dynamic voltage sag corrector may be implemented as described in U.S. Pat. No. 6,118,676, which is incorporated herein by reference in its entirety. The dynamic voltage sag protector 20 may be utilized with single phase or polyphase AC power, particularly three phase power, in which case three dynamic voltage sag correctors 20 are utilized and in which the AC input lines 22 and 23 are input line and neutral, respectively, and the output lines 25 and 26 are output line and neutral, respectively, for a three phase system.

The exemplary dynamic voltage sag corrector 20 includes a bypass switch 30 and a power conversion module 31. A system controller 32 monitors the voltage level provided at the input lines 22 and 23 and the voltage at the output lines 25 and 26. Under normal operating conditions, when the utility power source is providing power to the lines 22 and 23 at normal power levels (e.g., within 10% of the nominal AC input voltage level), the static bypass switch 30 is closed and power is provided directly from the input line 22 to the output line 25 on an AC bus line 28. The AC input neutral line 23 is directly connected to the output neutral line 26 by an AC bus line 29. Three phase systems may be either 3-wire or 4-wire systems. For 3-wire systems, the neutral line remains internal to the sag corrector. The bidirectional bypass switch 30 may comprise anti-paralleled thyristors 34 (SCRs), the gates of which are supplied by a driver 36, as shown in FIG. 1. The gate driver 36 is connected to the controller 32 to receive control signals therefrom. When the system controller detects a drop of the input voltage level on the input lines 22 and 23 which exceeds an acceptable amount, the system controller provides control signals through the driver 36 to the gates of the thyristors 34 to cause them to turn off so that power is no longer directly provided on the conducting line 28 which connects the input line 22 and the output line 25, and the controller then provides signals through a gate and relay driver 38 to the power conversion module 31 to control the module 28 to provide AC power at or near the nominal voltage level to the output lines 25 and 26. During voltage sag conditions, energy from the module is added to available power from the utility lines. For example, where the input voltage is at least 50% of nominal, power is provided to the module through the input rectifiers 42. This power is inverted by the module and is added to the power from the utility lines. Where the input is below 50%, the module relies on energy stored in the DC bus capacitors 49 and 50. The dynamic voltage sag corrector 20 is capable of providing voltage sag compensation for a duration sufficient to provide correction of the vast majority of voltage sag conditions that are likely to occur (e.g., 1–2 seconds), but not for the rarely occurring extended power outages, thus avoiding the requirement for long-term energy storage devices such as batteries and flywheels.

The AC bus lines 28 and 29 connect the input terminal 22 to the output terminal 25 and the input terminal 23 to the output terminal 26, respectively. Circuit breakers 40 are connected in series with one or both of the AC bus lines 28 and 29 to automatically disconnect the dynamic voltage sag corrector (and a load connected thereto) from the input voltage source if the current drawn through the dynamic voltage sag corrector from the source to the load becomes excessive due to a fault condition, such as a short circuit in the load. The circuit breakers 40 may be implemented in a conventional manner. As long as the circuit breakers 40 are closed, the dynamic voltage sag corrector 20 is powered up and in operation to provide a protected output voltage at the output terminals 25 and 26.

As described above, the dynamic voltage sag corrector 20 includes a bypass switch 30 and a power conversion module 31. The bypass switch 30 is connected in series in one of the AC bus lines, e.g., the bus line 28 as shown in FIG. 1. The bypass switch 30 may be implemented in a conventional manner, e.g., as discussed above, as thyristors connected in anti-parallel to conduct in opposite directions to provide bidirectional conduction through the bypass switch when the thyristors are turned on. Other types of power transfer devices, including other semiconductor switches and mechanical switches, may also be utilized.

The power conversion module is preferably implemented as an AC power conversion circuit which utilizes a minimum number of switching devices to provide a corrected output voltage to a load when there is a sag or a drop in the source voltage provided at the input terminals. The basic arrangement of a preferred AC power conversion circuit is described in U.S. Pat. No. 5,099,410, the disclosure of which is incorporated herein by reference. It is also understood that other power conversion circuits including other inverter topologies may be utilized in the present invention.

The exemplary power conversion module 31 shown in FIG. 1 includes a rectifier 41 formed of a pair of rectifying devices 42 (e.g., semiconductor diodes) connected in series with each other across a high DC bus line 45 and a low DC bus line 46. The rectifying devices 42 are connected together at a node 43 which is connected by a line 47 to the AC bus line 29 and thus to the AC input terminal line 23. Also connected in series across the DC bus lines 45 and 46 are first and second energy storage capacitors 49 and 50, which are connected together at a node 51 to which a common line 53 is connected. The common line is connected to the other AC bus line 28 and thence to the other AC input terminal 22 via the parallel combination of a switch 55 and a resistor 56. The switch 55 is controllable to open and close via control signals provided on a line 57 from the gate and relay driver 38 which receives control signals from the controller 32. Also connected in series across the DC bus lines 45 and 46 are a first controllable inverter switching device 60 and a second inverter switching device 61, which may be implemented as shown in FIG. 1 as IGBTs with anti-parallel diodes 62, although other suitable switching devices may be utilized, such as MOSFETs, bipolar transistors, etc. The switching devices 60 and 61 are connected together at a node 63 which is connected to an output line 64 of the power conversion module, and a second AC output line 65 of the power conversion module is connected to the node 51 and thus to the common line 53. A low pass filter formed of a series inductor 67 and a capacitor 68 are connected to the output lines 64 and 65, and the output of the low pass filter is provided on a line 70 via a relay switch 71 to the AC output line 25. The output relay 71 is opened to prevent charging of the storage capacitors 49 and 50 through the inverter switching device diodes 62 during system startup, and to isolate a load from the power conversion module if necessary during an output over-voltage condition. The charging resistor 56 is provided to enable soft charging of the storage capacitors 49 and 50 at the startup of the voltage sag corrector. The input relay 55 connected in parallel with the charging resistor is provided to bypass the charging resistor once the storage capacitors 49 and 50 have been initially charged. An AC to DC power supply 73 is connected between the output lines 25 and 26 and supplies power on a line 74 to the controller 32. The power supply 73 receives power either directly from the input terminals when the bypass switch 30 is closed or from the power conversion module 31 when the bypass switch 30 is opened and a voltage sag condition is being corrected. The DC power supply 73 may be implemented in a conventional manner, for example, as a commercially available integrated circuit power supply that provides the required DC operating voltage levels to the system controller at controlled levels despite variations in the AC output voltage on the lines 25 and 26. A more complete description of the construction and operation of the voltage sag corrector topology and its control is provided in U.S. Pat. No. 6,118,676.

In the present invention, accommodation of regenerative loads connected to the output lines 25 and 26 is obtained utilizing a bus discharge control circuit shown generally within the dashed lines labeled 80 in FIG. 1. The circuit 80 includes a first DC bus discharge switching device 81 connected in series with a discharge resistor 82 between the high DC bus line 45 and the common line 53, and a second DC bus discharge switching device 84 connected in series with a discharge resistor 85 between the common line 53 and the low DC bus line 46. Regenerative DC bus line control circuits 86 and 87, which may be implemented separately (preferred, so as to avoid signal voltage isolation problems) or as the same circuit are connected via control lines 88 and 89 to the gates of the controlled switching devices 81 and 84 (e.g., IGBTs) to control the switching of these devices. In the implementation shown in FIG. 1, anti-parallel diodes 91 and 92 are connected in parallel with the switching devices 81 and 84. A first thyristor 94 is connected in parallel with the first discharge switching device 81, and a second thyristor 95 is connected in parallel with the second switching device 84. The thyristors 94 and 95 have the gates thereof connected by control lines routed through the regenerative controller 86 and 87 to receive external control signals, and an external DC bus discharge signal line 97 is connected to the regenerative controllers 86 and 87 to provide a control signal thereto when the DC buses are to be completely discharged after shutdown. At shutdown, an externally provided control signal turns on the thyristors 94 and 95 to fully discharge the storage capacitors 49 and 50. Thyristors 94 and 95 are preferably used for this purpose since they remain latched on once they receive the turn-on signals at their gates. Snubber circuits 97 and 98 are preferably connected to the switching devices 81 and 84, respectively, as discussed further below. As illustrated in FIG. 1 for exemplification, the snubber circuit 97 includes a diode 99 and a capacitor 100 connected in series across the switching device 81, with a resistor 101 connected from the junction between the diode 99 and the capacitor 100 to the high DC bus line 45. The snubber 98 includes a series connected diode 102 and capacitor 103 connected in parallel with the second switching device 84, with a resistor 104 connected from the junction between the diode 102 and the capacitor 103 to the common line 53. The capacitors 100 and 103 of the snubber circuits 97 and 98 are normally maintained at the DC bus voltage. When the discharge switches 81 and 84 are turned off, energy stored in the parasitic inductance of the resistor (82 and 85) wiring forces current to flow through the diodes 99 and 102 and the energy stored in the parasitic inductances is absorbed by the capacitors 100 and 103. The accumulated charge in the capacitors 100 and 103 is returned to the main DC bus through the resistors 101 and 104. These resistors are required to provide damping so that oscillations do not occur as charge transfers back to the DC bus.

Figure 4:
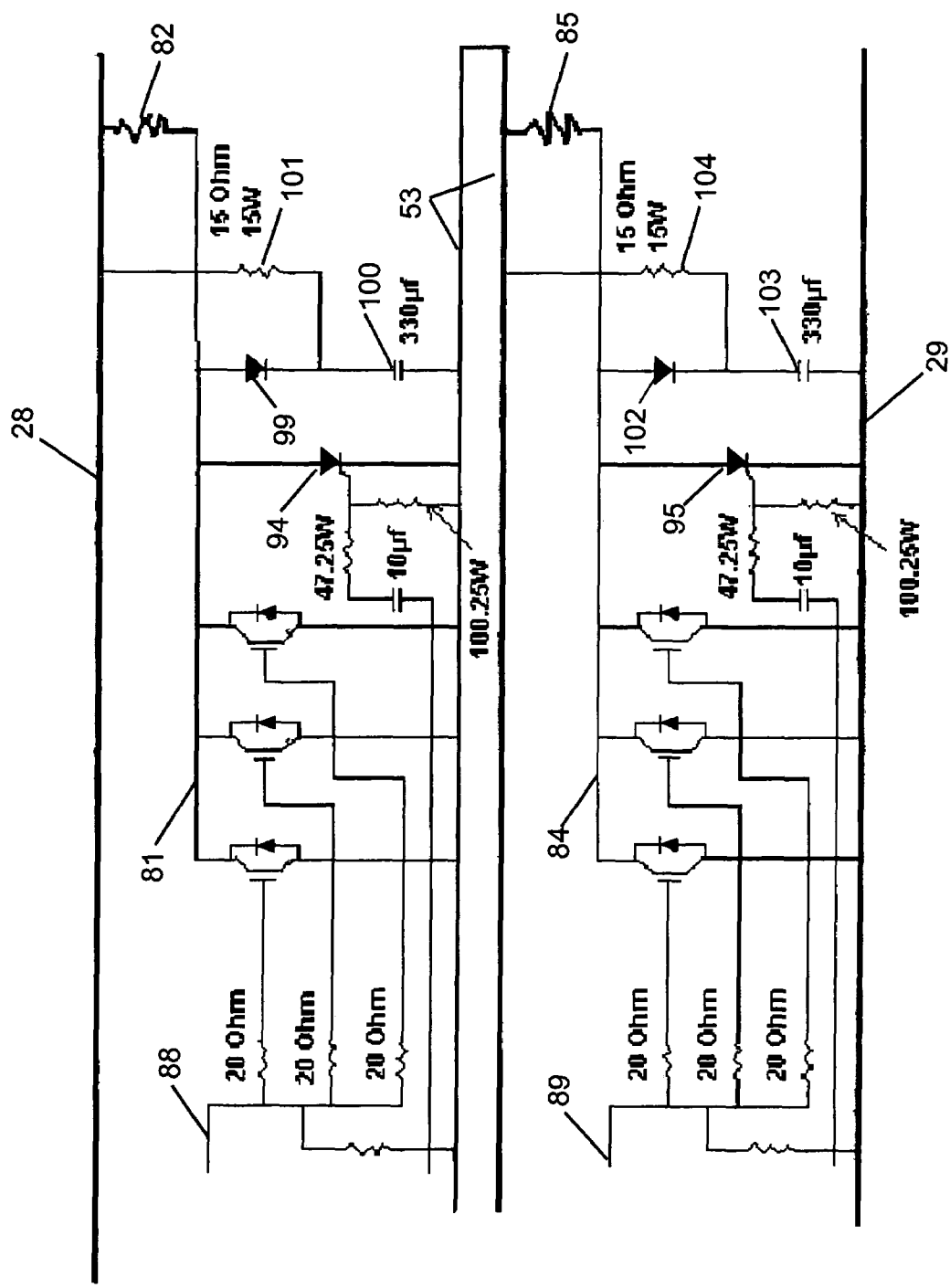
FIG. 4 is a schematic circuit diagram illustrating a preferred connection of multiple paralleled IGBTs used as the bus discharge switching devices in accordance with the invention.

As illustrated in FIG. 4, the switching devices 81 and 84 may be implemented as multiple switches (e.g., three IGBTs as shown) connected in parallel to provide a greater maximum current rating than a single IGBT (or other semiconductor switch).

Figure 2:
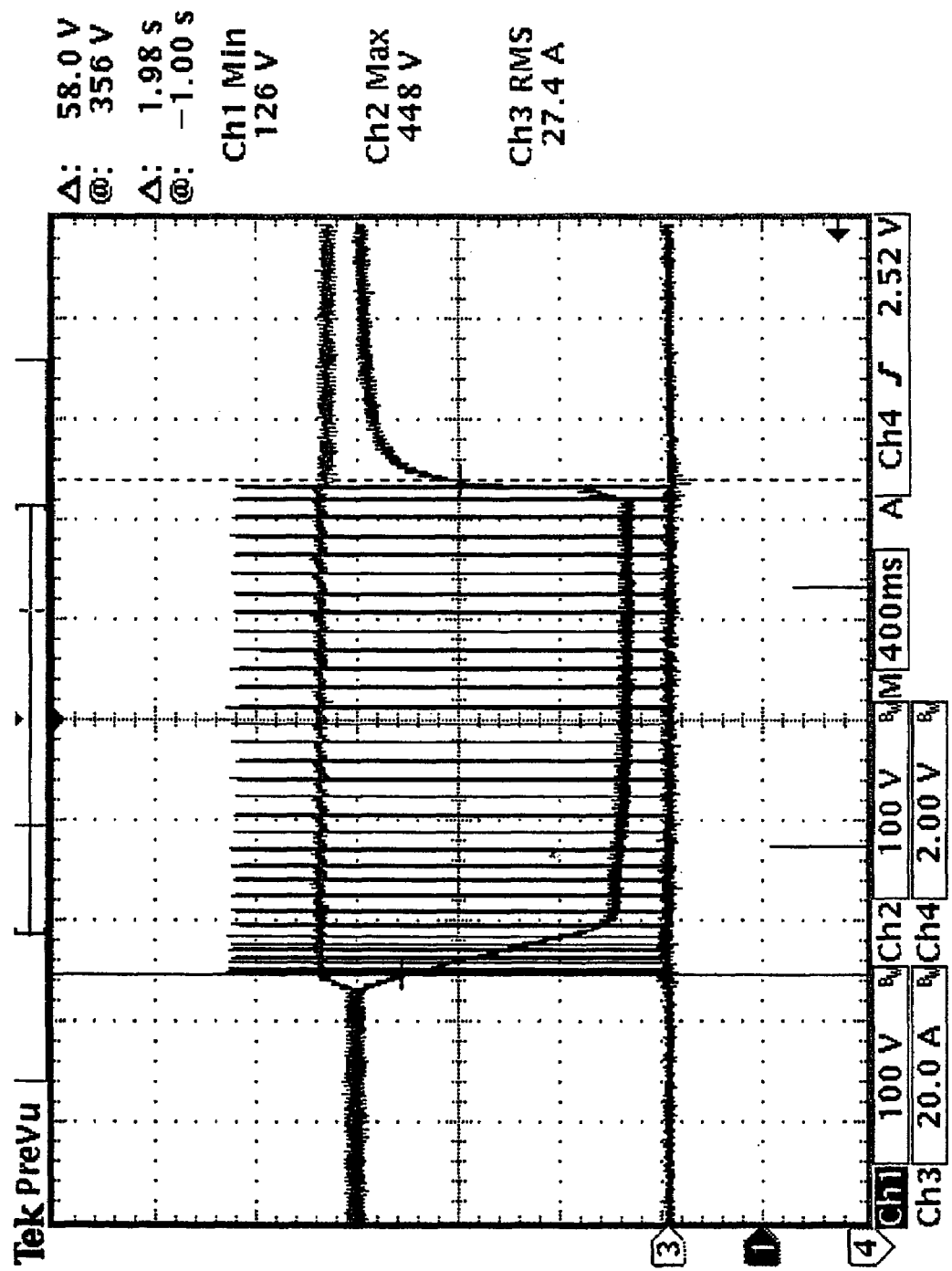
FIG. 2 are graphs of DC bus line voltages and currents in a sag corrector in accordance with the invention during a simulated regenerative load condition.

An operational waveform showing the independent behavior of the two half-bus regulators in the circuit 80 during correction of a voltage sag by the sag corrector 20 is shown in FIG. 2. In this case, the load current has a significant DC component which results in charge transfer from one-half of the bus to the other half (i.e., from one of the capacitors 49 and 50 to the other). Both DC buses start at approximately 400 V, the initial voltage across the capacitors 49 and 50. Channel 1 shows how one DC bus half has dropped to the peak of the sagged incoming line voltage (126 V) and channel 2 shows how the other half of the bus has risen to the regulator trip level (448 VDC). Channel 3 shows the pulsing of the discharge resistor current as the regulator operates throughout the sag correction cycle. This example illustrates the need for independent regulators for each half of the DC bus because a single regulator across the high and low DC bus lines 45 and 46 would have attempted to limit the bus to 900 VDC and, in doing so, it would have allowed the voltage across the capacitor that absorbs the regenerative power to rise to 774 VDC (900 VDC−126 VDC), which far exceeds the safe rating for the energy storage capacitor.

Figure 3:
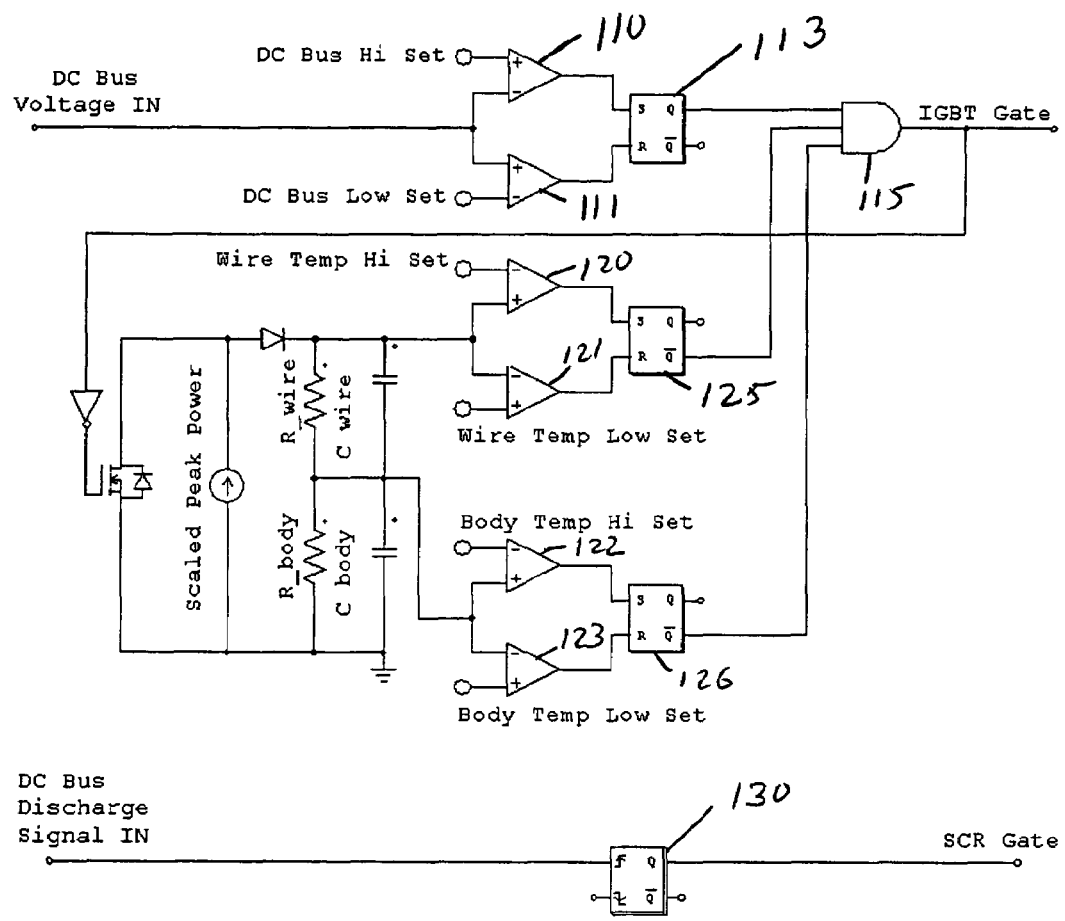
FIG. 3 is a schematic circuit diagram of an implementation of the DC bus discharge control circuit in accordance with the invention.

The regenerative controller circuits 86 and 87 are preferably implemented utilizing a microprocessor or digital signal processor, which may also incorporate the functions of the controller 32. This can be done in a manner which reduces circuit board area and parts counts and allows for implementing longer timing functions for resistor protection. The only additional functional hardware implementation then required is a window comparator for the DC bus voltage. For purposes of illustrating the control features of the invention, an equivalent circuit which carries out the control functions and which may be implemented in either a hard wired circuit or in a microprocessor circuit is shown in FIG. 3. An example of a microcontroller that can be utilized and programmed to implement the control circuits is a Microchip PIC 12C672, but it is understood that any hard wired or programmable controller may be utilized to carry out the control current operation. The discharge resistor may be modeled as, e.g., a linear system which heats up in response to application of a constant current with a declining exponential increase in temperature toward a maximum steady-state temperature, and an exponential decrease when the current is removed.

A first-order thermal model for a physical power resistor consists of a point heat source $q_{res}$ representing the resistor's power dissipation, a point thermal mass with heat storage capacity $C_{th}$ and a heat flow resistance $R_{th}$ between the point source and ambient air. $C_{th}$ is expressed in terms of $$\left[\frac{\text{Joules}}{\text{°Celsius}}\right]$$

and $R_{th}$ in the terms of $$\left[\frac{\text{°Celsius}}{\text{Watt}}\right].$$

When a change in resistor current occurs, there is a corresponding change in heat generated by the resistor. This heat has two paths to flow: into the thermal mass and into the ambient air. The quantity that flows to the air is determined by the difference in the temperature between the resistor and the ambient air ($\Delta T$) divided by the thermal resistance $R_{th}$. The remaining heat is absorbed by the thermal mass and raises its temperature according to its thermal capacity. Over time, if the resistor power remains constant, a steady state condition will be reached where all the resistor power is flowing to ambient air and $\Delta T$ remains constant. The differential equation describing this model is expressed as:

$$C_{th}\frac{d\Delta T}{dt} + \frac{\Delta T}{R_{th}} = q_{res}$$

A Laplace domain transfer function model of the above is:

$$\frac{\Delta T(s)}{Q(s)_{res}} = \frac{R_{th}}{s R_{th} C_{th} + 1}$$

This model can be used to implement an open loop observer of the resistor temperature. For estimated parameters $R_{th}$ and $C_{th}$ and given a resistor power function $Q(s)_{res}$, the model will produce an estimated temperature rise of the resistor. Then, a control loop can be closed around this estimated temperature to insure that the maximum energy can be absorbed by the resistor without exceeding its safe temperature. This sets the maximum power pulse width that the resistor can handle before the dynamic discharge switch is turned off to let the resistor cool. After cooling down a few degrees, the discharge switch can be turned back on until the maximum temperature is again reached. At this point the switching is duty cycle limited so as to keep the resistor temperature from exceeding a safe temperature. The key advantage of this type of control is that it allows the discharge to have a very large initial first pulse that greatly exceeds its average capability. This first pulse is often large enough to absorb a transient and avoids requiring a large continuous rating of the resistor.

Certain simplifying assumptions can be made to implement the most basic controller:

1) The power into the resistor $Q(s)_{res}$ is proportional to the square of the average regulated DC bus voltage
2) The ambient temperature is assumed worst case for the specified application e.g., 50° C.

While an analog observer circuit implementation is possible in theory, it may not be practical given the time constants of large wire wound resistors, which may be on the order of tens of seconds. The preferred implementation is within a microprocessor program. The observer transfer function can be expressed in the form of a Z transform:

$$\frac{\Delta T(z)}{Q(z) res} = R_{th}\frac{(1-e^{-T/\tau})z^{-1}}{1-e^{-T/\tau}z^{-1}}$$

where $\tau = R_{th} C_{th}$ and T is the sampling period $Q(z)_{res}$ is simply a constant power value determined by the DC bus regulating voltage of the dynamic discharge multiplied by the duty cycle of the discharge switch. This sampled power value is effectively convolved with the transfer function above to yield a $\Delta T(z)$ for the resistor. As mentioned earlier, this $\Delta T(z)$ is compared to $\Delta T(z)_{max}$ and, if greater, the dynamic discharge switch is turned off until $\Delta T(z)$ falls below a lower threshold. As long as the DC bus regulation is called for, the resistor temperature bounces between a hysteresis band to keep the resistor temperature relatively constant.

A closed loop observer may be implemented with the addition of an average temperature sensor feedback, but with added costs and complexity. An ambient temperature sensor may also be added so that incrementally more energy could be absorbed by the resistor when the ambient air is cool.

A more complex model can be implemented that takes into account the $R_{th}$ and $C_{th}$ of the wire element and a separate $R_{th}$ and $C_{th}$ for the additional body mass that the wire is wound around. In this case we have two first order models that can be regulated separately and combined by superposition, or one second order model where the effects of both wire and body are modeled by one equation. Two first order models is the preferred implementation.

This model can be implemented using the RC circuits shown in FIG. 3 wherein one RC circuit models the wire of a wire wound resistor and the other models the body of the resistor, allowing the control circuit to ensure that neither the body nor the wire overheats even though they have two different temperature response time constants. Where a resistor is used that effectively has a single temperature time constant a single RC circuit can be used as the model. It is understood that the circuit diagrams of FIG. 3 are equivalent discrete component circuits that can be used to implement a model of the dynamic temperature characteristics of the discharge resistor, and will generally require resistance and capacitance values that are too large for a practical analog circuit. The control algorithm represented by these diagrams is preferably implemented in the programming of a digital controller.

The control circuits 86 and 87 for each half-bus shunt regulator section are powered from the logic level power supply 73 derived off of the incoming DC bus voltage. Set points are determined for a window comparator circuit comprised of comparators 110 and 111 that defines a hysteresis voltage band for switching the bus discharge IGBT. When the DC bus voltage reaches the high set point a SR latch 113 is set high, sending a signal to an AND gate 115, enabling the IGBT (81 or 84) and thus connecting the resistance 82 or 85 across the DC half-bus. As a consequence, energy is dissipated in the resistor 82 or 85 and the DC bus voltage begins to drop. When it hits the lower set point, the SR latch 113 is reset low and disables the IGBT (81 or 84). The DC bus voltage will begin rising again, and once it hits the high set point the ON/OFF cycle will repeat itself. This cycling will continue so as to regulate the DC bus voltage until regeneration into the DC bus stops.

The shunt resistors 82 and 85 should be designed such that they draw sufficient DC bus current to draw net charge out of the DC bus capacitor 49 or 50 under maximum anticipated regenerative loading; otherwise the DC bus voltage may continue to rise even with the IGBT on. This requirement would lead to very massive and costly resistors if the inverter of the sag corrector were required to operate continuously under regenerative conditions for relatively long periods of time. However, given the expected momentary and infrequent operation of the sag correction devices 20, the resistor's average dissipative power rating can be optimized to these high peak, low operating duties. The resistors 82 and 85 are modeled in the programming of the controllers 86 and 87 as having a wire thermal capacity and a body thermal capacity each having an associated thermal time constant. The wire time constant must be such that it can absorb the peak power developed when the resistor is switched across the bus without getting to a destructive temperature, with a temperature ripple about an average value that depends on the duty cycle of the IGBT switching. The body of the resistor 82, 85 has a typically longer thermal time constant than the wire time constant, and the body temperature tends to respond more to the average power dissipated by the resistor, and thus the average power may be used for the resistor rating.

A fixed duty cycle and period may be programmed into the processor driving the IGBT (81 or 84) switching that guarantees that the resistor power rating is never exceeded. However, this scheme does not take advantage of the inherent thermal capacities of both the resistor wire and body which allow the resistor to absorb significantly more transient energy when it has been off and is initially at ambient temperature. This is typical of the operational duty cycle of a sag corrector 20. The protection arrangement of the invention takes advantage of this. An open loop observer model as discussed above for both the resistor wire and the resistor body of each resistor 82 and 85 is programmed into the controller(s) 86 and 87. The duty cycle of the IGBT is fed as input into the observers and a virtual temperature is determined for both the wire and the body of each resistor. These temperatures are fed into window comparators 120, 121, 122 and 123 as illustrated in FIG. 3, and if the high set point temperature is reached, SR latches 125 and/or 126 are set and the signals therefrom passed to the AND gate 115 so that the IGBT is disabled regardless of the bus voltage. The virtual temperature then cools until the lower set point is reached, and the IGBT 81 or 84 is then enabled to resume switching. This approach optimizes both the resistor wire thermal capacity and body capacity for the unique duty cycles of sag correctors. The result is a very economical design with minimal component sizes. This affects the IGBT and snubber component sizes as well. For example, 75A IGBT's 81 and 84 may be sufficient for a 400A rated inverter. Because the sag corrector is intended to operate for short periods of time, the discharge resistors generally do not need to be rated to dissipate regenerative power for more than a few seconds. For example, if there is an extended power sag or outage, the inverter of the sag corrector is automatically turned off and the bypass switch 30 is turned back on by the controller 32 of the sag corrector, allowing the regenerative power to be fed back into the utility power lines.

A final control feature includes a one-shot circuit 130 to pulse the gate of the thyristors (SCRs) 94 and 95 that are parallel with the IGBTs (81 and 84). The thyristors are used when it is desired to discharge the DC bus after main power has been removed from the sag corrector. Thyristors are preferably used because of their latched turn-on characteristic. The gate pulse is derived when the bus voltage is high and the power supply 73 is operational. As the bus voltage decays, the logic power supply eventually decays. Thyristors are not dependent on the power supply to maintain conduction, so it will continue to discharge the DC bus until the discharge current falls below the latching threshold of the thyristor. There are two reasons why the IGBTs 81 and 84 are preferably not used to discharge the DC bus in this condition. First, an IGBT requires continuous gate voltage to stay in the saturated ON state. As the bus discharges, it becomes difficult to maintain IGBT gate voltage—the thyristor avoids this problem. The second reason is that the thyristor provides an independent safety discharge means and will continue to function even if the IGBT circuit has failed for some reason.

It is understood that the invention is not limited to the embodiments set forth herein for illustration, but encompasses all forms thereof that come within the scope of the following claims.

What is claimed is:

1. A power conversion module comprising:
   (a) a rectifier having rectifying devices connected to receive AC input power from AC input lines and to provide DC power on high and low DC bus lines;
   (b) first and second energy storage capacitors connected in series across the DC bus lines, the connection between the capacitors defining a common node, a DC bus common conducting line connected to the common node;
   (c) an inverter having inverter switching devices connected to the DC bus lines to receive DC power therefrom, the inverter switching devices switchable to provide AC output power;
   (d) a first bus discharge switching device and a discharge resistor connected in series across the high DC bus line and the common line and connected in parallel with the first energy storage capacitor, and a second bus discharge switching device and a discharge resistor connected in series between the common line and the low DC bus line and connected in parallel with the second energy storage capacitor; and
   (e) a DC bus control circuit connected to the DC bus lines and the common line to receive the voltage therefrom and connected to the first and second bus discharge switching devices to selectively turn the first discharge switching device on for a period of time when the voltage between the high DC bus line and the common line exceeds a selected limit and to turn the second discharge switching device on for a period of time when the voltage between the low DC bus line and the common line exceeds a selected limit, to thereby discharge the energy storage capacitors to reduce the voltage thereon.

2. The power conversion module of claim 1 wherein the rectifier comprises a pair of diodes connected together in series across the DC bus lines with a node connected therebetween which is connected to an AC input line, one of the diodes connected to conduct into the node and the other diode connected to conduct away from the node, the diodes connected across the DC bus lines to provide DC power thereto;

and wherein the inverter comprises a pair of controllable inverter switching devices connected in series across the DC bus lines and having an output node formed at the connection between the two inverter switching devices, the output node connected to one AC output line.

3. The power conversion module of claim 2 wherein the controllable inverter switching devices comprise IGBTs with anti-parallel connected diodes.

4. The power conversion module of claim 1 further including a thyristor connected in parallel with each of the discharge switching devices and a control circuit connected to the gate of each thyristor to switch the thyristors into conduction when the power conversion module is turned off to fully discharge the energy storage capacitors after turn-off of the module.

5. The power conversion module of claim 1 further including a snubber circuit connected to each discharge switching device, each snubber circuit including a diode and capacitor connected in parallel with the discharge switching device and a resistor connected between a DC bus line and the connection between the snubber diode and capacitor.

6. The power conversion module of claim 1 wherein the control circuit controls the switching of each discharge switching device during an over voltage condition between the DC bus line and the common line to which the switching device is connected to switch on and off periodically with a selected duty cycle to discharge energy from the energy storage capacitor through the discharge resistor at a rate which does not exceed the power rating of the discharge resistor.

7. The power conversion module of claim 6 wherein the control circuit switches the discharge switching device on and off during an over voltage condition with a fixed duty cycle.

8. The power conversion module of claim 6 wherein the control circuit controls the switching of the discharge switching device during an over voltage condition utilizing a variable duty cycle and period based on the dynamic power dissipation characteristics of the discharge resistor.

9. The power conversion module of claim 8 wherein the variable duty cycle and period are determined by the temperature of a model of the discharge resistor such that the discharge switching device is turned off when the model of the discharge resistor indicates that a high set point temperature has been reached, and is turned on when the model of the discharge resistor indicates that a lower set point temperature has been reached.

10. The power conversion module of claim 1 wherein each bus discharge switching device comprises multiple IGBTs connected in parallel and controlled by the control circuit to switch in common.

11. A dynamic voltage sag corrector comprising
(a) AC input and output terminals;
(b) a bypass switch connected between the input terminals and the output terminals and responsive to bypass switch control signals to open and close the bypass switch;
(c) a power conversion module connected in parallel with the bypass switch between the input terminals and the output terminals, the power conversion module comprising:
(i) a rectifier having rectifying devices connected to receive AC input power from the input terminals and to provide DC power on high and low DC bus lines;
(ii) first and second energy storage capacitors connected in series across the DC bus lines, the connection between the capacitors defining a common node, a DC bus common conducting line connected to the common node;
(iii) an inverter having inverter switching devices connected to the DC bus lines to receive DC power therefrom, the inverter switching devices switchable to provide AC output power to the output terminals;
(iv) a first bus discharge switching device and a discharge resistor connected in series across the high DC bus line and the common line and connected in parallel with the first energy storage capacitor, and a second bus discharge switching device and a discharge resistor connected in series between the common line and the low DC bus line and connected in parallel with the second energy storage capacitor; and
(v) a DC bus control circuit connected to the DC bus lines and the common line to receive the voltage therefrom and connected to the first and second bus discharge switching devices to selectively turn the first discharge switching device on for a period of time when the voltage between the high DC bus line and the common line exceeds a selected limit and to turn the second discharge switching device on for a period of time when the voltage between the low DC bus line and the common line exceeds a selected limit, to thereby discharge the energy storage capacitors to reduce the voltage thereon; and (d) a system control circuit that receives the AC input voltage from the input terminals and determines a voltage sag condition when the AC line voltage drops below a selected low line voltage threshold level, and then provides a bypass switch control signal to the bypass switch to open the bypass switch in response to the detection of a voltage sag condition and controls the inverter of the power conversion module to provide an AC output voltage at the output terminals at approximately a pre-voltage sag condition level.

12. The sag corrector of claim 11 wherein the rectifier comprises a pair of diodes connected together in series across the DC bus lines with a node connected therebetween which is connected to an AC input terminal, one of the diodes connected to conduct into the node and the other diode connected to conduct away from the node, the diodes connected across the DC bus lines to provide DC power thereto;

and wherein the inverter comprises a pair of controllable inverter switching devices connected in series across the DC bus lines and having an output node formed at the connection between the two inverter switching devices, the output node connected to one AC output terminal.

13. The sag corrector of claim 11 wherein the controllable inverter switching devices comprise IGBTs with anti-parallel connected diodes.

14. The sag corrector of claim 11 further including a thyristor connected in parallel with each of the discharge switching devices, and a control circuit connected to the gate of each thyristor to switch the thyristors into conduction when the sag corrector is turned off to fully discharge the energy storage capacitors after turn-off of the sag corrector.

15. The sag corrector of claim 11 further including a snubber circuit connected to each discharge switching device, each snubber circuit including a diode and capacitor connected in parallel with the discharge switching device and a resistor connected between a DC bus line and the connection between the snubber diode and capacitor.

16. The sag corrector of claim 11 wherein the DC bus control circuit controls the switching of each bus discharge switching device during an over voltage condition between the DC bus lines and the common line to which the switching device is connected to switch on and off periodically with a selected duty cycle to discharge energy from the energy storage capacitor through the discharge resistor at a rate which does not exceed the power rating of the discharge resistor.

17. The sag corrector of claim 16 wherein the control circuit switches the discharge switching devices on and off during an over voltage condition with a fixed duty cycle.

18. The sag corrector of claim 16 wherein the control circuit controls the switching of the discharge switching device during an over voltage condition utilizing a variable duty cycle and period based on the dynamic power dissipation characteristics of the discharge resistor.

19. The sag corrector of claim 18 wherein the variable duty cycle and period are determined by the temperature of a model of the discharge resistor such that the discharge switching device is turned off when the model of the discharge resistor indicates that a high set point temperature has been reached, and is turned on when the model of the discharge resistor indicates that a lower set point temperature has been reached.

20. The sag corrector of claim 11 wherein each bus discharge switching devices comprises multiple IGBTs connected in parallel and controlled by the DC bus control circuit to switch in common.

21. A method of controlling the voltage on DC bus lines of a power conversion system having a rectifier supplying DC power to the DC bus lines and an inverter receiving the DC power from the DC bus lines and providing AC output power, wherein an energy storage device is connected across the DC bus lines to receive power from or supply power to the DC bus lines such that an over-voltage can be imposed on the energy storage device during over-voltage transients passed through the rectifier or from regenerative power fed back from the inverter to the DC bus lines, comprising:
- (a) connecting a bus discharge switching device and a discharge resistor in series across the DC bus lines and in parallel with the energy storage device;
- (b) detecting when an over-voltage condition occurs on the DC bus lines;
- (c) during the over-voltage condition, controlling the switching of the discharge switching device to switch on and off periodically utilizing a variable duty cycle and period based on the dynamic power dissipation characteristics of the discharge resistor.

22. The method of claim 21 wherein the variable duty cycle and period are determined by the temperature of a model of the discharge resistor such that the discharge switching device is turned off when the model of the discharge resistor indicates that a high set point temperature has been reached, and is turned on when the model of the discharge resistor indicates that a lower set point temperature has been reached.

23. A power conversion module comprising:
- (a) DC bus lines;
- (b) a rectifier supplying DC power to the DC bus lines;
- (c) an inverter having controllable switching devices receiving the DC power from the DC bus lines and providing AC output power;
- (d) an energy storage device connected across the DC bus lines to receive power from or supply power to the DC bus lines such that an over-voltage can be imposed on the energy storage device during over-voltage transients passed through the rectifier or from regenerative power fed back from the inverter to the DC bus lines;
- (e) a bus discharge switching device and a discharge resistor connected in series across the DC bus lines and in parallel with the energy storage device; and
- (f) a DC bus control circuit connected to the DC bus lines to receive the voltage therefrom and connected to the bus discharge switching device to detect when an over-voltage condition occurs on the DC bus lines, the control circuit configured to control the switching of the discharge switching device during the over-voltage condition, to switch on and off periodically utilizing a variable duty cycle and period based on the dynamic power dissipation characteristics of the discharge resistor.

24. The power conversion module of claim 23 wherein the control circuit determines the variable duty cycle and period by the temperature of a model of the discharge resistor configured in the control circuit such that the discharge switching device is turned off when the model of the discharge resistor indicates that a high set point temperature has been reached, and is turned on when the model of the discharge resistor indicates that a lower set point temperature has been reached.

25. The power conversion module of claim 23 wherein the energy storage device is a capacitor.

26. The power conversion module of claim 23 further including a snubber circuit connected to the discharge switching device, the snubber circuit including a diode and capacitor connected in parallel with the discharge switching device and a resistor connected between a DC bus line and the connection between the snubber diode and capacitor.

* * * * *